(12) United States Patent
Twede et al.

(10) Patent No.: US 9,105,273 B1
(45) Date of Patent: Aug. 11, 2015

(54) ELECTRON-ACTIVATED PHOTON EMISSION MATERIAL AND USE THEREOF

(71) Applicant: Lockhead Martin Corporation, Bethesda, MD (US)

(72) Inventors: David R. Twede, Orlando, FL (US); Matthew G. Comstock, Orlando, FL (US); Matthew F. Catron, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/169,906

(22) Filed: Jan. 31, 2014

Related U.S. Application Data

(60) Provisional application No. 61/759,585, filed on Feb. 1, 2013.

(51) Int. Cl.
*A61N 5/00* (2006.01)
*G11B 7/0045* (2006.01)

(52) U.S. Cl.
CPC .................................... *G11B 7/0045* (2013.01)

(58) Field of Classification Search
CPC ........... H01J 29/46; H01J 37/22; H01J 37/28; H01J 37/224; H01J 37/226; H01J 37/244; H01J 37/26; H01J 37/29; H01J 37/285
USPC ......... 250/306, 307, 311, 492.1, 492.2, 492.3
See application file for complete search history.

(56) References Cited

U.S. PATENT DOCUMENTS

| | | | |
|---|---|---|---|
| 6,950,492 B2 | 9/2005 | Besson | |
| 6,960,767 B1 * | 11/2005 | Do et al. | ........................ 250/311 |
| 7,121,474 B2 | 10/2006 | Bourianoff et al. | |
| 7,532,703 B2 | 5/2009 | Du et al. | |
| 7,937,280 B1 | 5/2011 | Leung et al. | |
| 2002/0117635 A1 * | 8/2002 | Shinada et al. | ............ 250/492.3 |
| 2009/0027518 A1 | 1/2009 | Kita | |
| 2013/0215912 A1 | 8/2013 | Shkunov et al. | |
| 2014/0194314 A1 | 7/2014 | Walsworth et al. | |

FOREIGN PATENT DOCUMENTS

WO    WO 2012174173 A2 * 12/2012

OTHER PUBLICATIONS

Ferrer et al., Atomic structure of three-layer Au/Pd nanoparticles revealed by aberration-corrected scanning transmission electron microscopy, Mar. 19, 2008, Journal of Materials Chemistry, pp. 2442-2446.*
Author Unknown, "Luminescent Up-conversion Nanocrystals," Biochemical Products, Sigma-Aldrich Co. LLC, 2013, http://www.sigmaaldrich.com/life-science/biochemicals/biochemical-products, accessed Apr. 23, 2013, 1 page.

(Continued)

*Primary Examiner* — Michael Logie
*Assistant Examiner* — Jason McCormack
(74) *Attorney, Agent, or Firm* — Withrow & Terranova, PLLC

(57) ABSTRACT

Electron-activated photon emission materials are disclosed. A first electron source emits a first electron having a first predetermined energy at a first nanoparticle of a photon emission material that includes a first layer of a plurality of nanoparticles. A first photonic response of the receipt of the first electron by the first nanoparticle is determined. The first photonic response is interpreted as a first numeric value.

22 Claims, 9 Drawing Sheets

(56) References Cited

OTHER PUBLICATIONS

Author Unknown, "Sunstone Upconverting Nanocrystals UCP 475," Material Safety Data Sheet, Version 5.1, Sigma-Aldrich Co. LLC, Revised May 31, 2012, 6 pages.

Author Unknown, "Sunstone Luminescent UCP Nanocrystals," Technical Document, Sigma-Aldrich Co. LLC, http://www.sigmaaldrich.com/technical-documents/articles/biology/upconverting-ucp-nanocrystals.html, accessed Apr. 23, 2013, 6 pages.

Shun, Poh Hou, "Towards a High Quality Polarization-Entangled Multi-Photon Source," A Thesis Submitted for the Degree of Master of Science, Department of Physics, National University of Singapore, 2009, 113 pages.

Gorris et al., "Photon-upconverting nanoparticles for optical encoding and multiplexing of cells, biomolecules, and microspheres," Angewandte Chemie International Edition, vol. 52, No. 13, Mar. 25, 2013, pp. 3584-3600 (abstract only).

McCutcheon et al., "Broadband frequency conversion and shaping of single photons emitted from a nonlinear cavity," Optics Express, vol. 17, No. 25, Dec. 7, 2009, 15 pages.

Suyver et al., "Novel materials doped with trivalent lanthanides and transition metal ions showing near-infrared to visible photon upconversion," Optical Materials, vol. 27, No. 6, Mar. 2005, pp. 1111-1130 (abstract only).

Tyson, Jeff et al., "How Airport Security Works," the Pallet, vol. 55, Feb. 2008, travel.howstuffworks.com/airport-security.htm, 5 pages.

Girard, C. et al., "The physics of the near-field," Reports on Progress in Physics, vol. 63, No. 6, Jun. 2000, IOP Publishing Ltd., 46 pages.

Jain, P., "Plasmons in Assembled Metal Nanostructures: Radiative and Nonradiative Properties, Near-Field Coupling and its Universal Scaling Behavior," Doctoral Dissertation, Georgia Institute of Technology, Apr. 2008, 316 pages.

Pucci, A. et al., "Chapter 8: Electromagnetic Nanowire Resonances for Field-Enhanced Spectroscopy," Lecture Notes in Nanoscale Science and Technology, vol. 3: One-Dimensional Nanostructures, Springer Science +Business Media, LLC, 2008, pp. 175-215.

Tiwari, S. et al., "A silicon nanocrystals based memory," Applied Physics Letters, vol. 68, No. 10, Mar. 4, 1996, American Institute of Physics, 3 pages.

Non-Final Office Action for U.S. Appl. No. 13/891,692, mailed Apr. 16, 2015, 10 pages.

Notice of Allowance for U.S. Appl. No. 14/107,231, mailed Apr. 16, 2015, 9 pages.

Notice of Allowance for U.S. Appl. No. 14/210,809, mailed Jun. 9, 2015, 7 pages.

\* cited by examiner

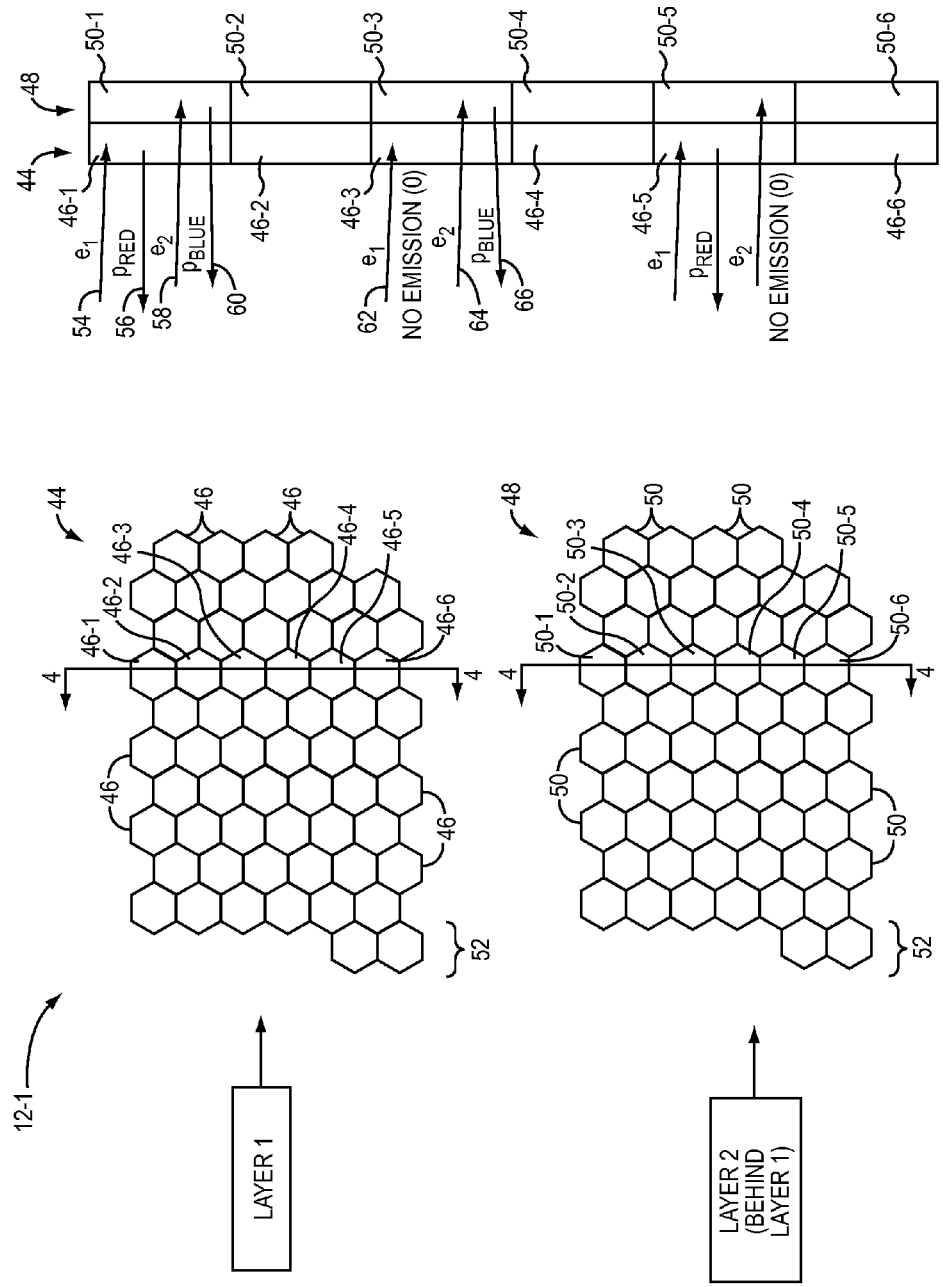

ELECTRON-ACTIVATED PHOTON EMISSION MATERIAL AND USE THEREOF

RELATED APPLICATIONS

This application claims priority to "ELECTRON ACTIVATED OPTICAL STORAGE," provisional patent application Ser. No. 61/759,585, filed Feb. 1, 2013, the disclosure of which is hereby incorporated herein by reference in its entirety.

TECHNICAL FIELD

The embodiments relate to data storage, and in particular to an electron-activated photon emission material.

BACKGROUND

Optical storage mediums, such as Digital Versatile Disk (DVD) and Blu-Ray™ disks, are read by focusing a light source, such as a laser, at a spinning disk on which data has been encoded, and interpreting the data encoded thereon based on changes in reflectivity of the light. A number of factors, including the wavelength of the light source, and the need to focus the light source on a spinning disk, limit the amount of data that may be encoded on an optical storage medium. The demand for increasingly larger storage capacities is unrelenting. Accordingly, there is a need for storage mechanisms that offer greater storage capacity than is currently available.

SUMMARY

The embodiments relate to an electron-activated photon emission material, and mechanisms for writing data to and reading data from such material. In one embodiment, a method for obtaining data from an electron-activated photon emission material is provided. A first electron source emits a first electron having a first predetermined energy at a first nanoparticle of an electron-activated photon emission material comprising a first layer of a plurality of nanoparticles. A first photonic response of the receipt of the first electron by the first nanoparticle is determined, and the first photonic response is interpreted as a first numeric value.

In one embodiment, the first photonic response is the receipt, by a sensor, of a photon in a predetermined wavelength band within a predetermined period of time. A second photonic response may be the receipt of no photon within the predetermined period of time. The first photonic response may be interpreted, for example, as the numeric value '1,' and the second photonic response may be interpreted, for example, as the numeric value '0.'

In one embodiment, the nanoparticles in the electron-activated photon emission material comprise one of a phosphor, a fluorophore, a nanotube, and a micro-nano crystal phosphor complex.

In one embodiment, the electron-activated photon emission material comprises two layers of nanoparticles, a first layer that comprises a plurality of nanoparticles of one composition, and a second layer behind the first layer that comprises a plurality of nanoparticles of another composition.

In one embodiment, the first electron source emits a second electron having a second predetermined energy at a second nanoparticle of the plurality of nanoparticles in the second layer. A second photonic response of the receipt of the second electron by the second nanoparticle is determined. The second photonic response is interpreted as a second numeric value.

In some embodiments, multiple electrons are concurrently emitted to read data in parallel from the electron-activated photon emission material. In one embodiment, the first electron source concurrently emits a plurality of electrons, including the first electron, that have a first predetermined energy at a group of nanoparticles in the first layer. Photonic responses of the receipt of the plurality of electrons by the group of nanoparticles are determined, and the photonic responses are interpreted as numeric values.

In another embodiment, the first electron source and a second electron source are oriented with respect to different areas of the electron-activated photon emission material. The second electron source emits, concurrently with the emission of the first electron by the first electron source, a second electron having the first predetermined energy at a second nanoparticle of the plurality of nanoparticles in the first layer. A second photonic response of the receipt of the second electron by the second nanoparticle is determined, and the second photonic response is interpreted as a second numeric value.

In another embodiment, a system is provided. The system includes a first electron source configured to emit a first electron having a first predetermined energy at a first nanoparticle of an electron-activated photon emission material comprising a first layer of a plurality of nanoparticles. A first sensor is configured to determine a photonic response of the receipt of the first electron by the first nanoparticle. A controller is configured to interpret the photonic response as a first numeric value.

In yet another embodiment, an electron-activated photon emission material is provided. The electron-activated photon emission material comprises a first planar substrate layer and a second planar substrate layer transparent to photons within a first predetermined wavelength band. A first nanocrystal layer is sandwiched between the first planar substrate layer and the second planar substrate layer. The first nanocrystal layer comprises a plurality of first nanocrystals, and each first nanocrystal has a lattice structure configurable to be altered to emit a photon within a first predetermined wavelength band upon receipt of an electron having a first predetermined energy.

In some embodiments, the electron-activated photon emission material may comprise multiple layers of nanocrystals. A second nanocrystal layer comprising a plurality of second nanocrystals may be sandwiched between the first nanocrystal layer and the second planar substrate. Each second nanocrystal has a lattice structure configurable to be altered to emit a photon within a second predetermined wavelength band upon receipt of an electron having a second predetermined energy.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 is a block diagram of a portion of a multiple-layer electron-activated photon emission material according to one embodiment;

FIG. 4 is a sectional view taken along line 4 of FIG. 3 of the multiple-layer electron-activated photon emission material according to one embodiment;

DETAILED DESCRIPTION

Figure 1C:
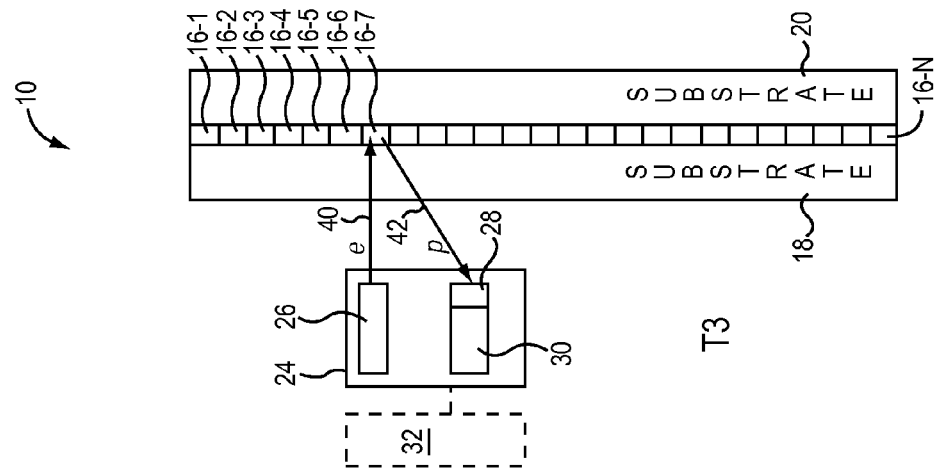
FIGS. 1A-1C are block diagrams of an environment for reading an electron-activated photon emission material according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims. Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first electron" and "second electron," and does not imply a priority, a type, an importance, or other attribute, unless otherwise stated herein. The phrase "band" as used herein means a particular wavelength or frequency of electromagnetic radiation, or a range of wavelengths or frequencies of electromagnetic radiation. The word "about" as used herein in conjunction with a value means within 10 percent of the value.

The present embodiments relate to electron-activated optical storage, and in particular to an electron-activated photon emission material, and use thereof in the storage of data. In some embodiments, data may be encoded in energy levels of electrons of the electron-activated photon emission material, and may be read by exciting the electrons to emit photons, which may be received, or otherwise sensed, and interpreted as data.

The electron-activated photon emission material may comprise a layer of a plurality of nanoparticles made of an electroluminescent material, such as frequency-shift phosphors, fluorophores, nanotubes, a micro-nano crystal phosphor complex, or the like. Due to the small size and wavelength of electrons, and with the ability to accurately direct an electron at a desired location, data may be encoded in the electron-activated photon emission material at a very dense level, much denser, for example, than is capable in conventional optical recording media, such as Digital Versatile Disks (DVDs) or Compact Disks (CDs). In one embodiment, data is encoded in nanoparticles in the electron-activated photon emission material as either a '1' or '0' (on, or off, respectively), according to whether a particular nanoparticle emits or does not emit optical energy in the form of photons.

Mechanisms for encoding data in the electron-activated photon emission material will be discussed in greater detail herein, but briefly, data is encoded in the electron-activated photon emission material by altering the energy transfer mechanism of conversion complexes in unique host lattices. For example, by designing the nanoparticles using a precise ratio of rare earth ions (by way of non-limiting example, ytterbium and erbium) in a ceramic lattice structure (for example, gadolinium oxysulfide), the optical energy emitted in the form of photons can be tuned for specific input electron activation, output photon wavelength, and lifetime of emission. The predetermined, tuned properties of the nanoparticle allows emission of a photon within a first predetermined wavelength band upon receipt of an electron having a predetermined energy.

Thus, the nanoparticle can have at least two states, a first state wherein the receipt of an electron having the predetermined energy causes the emission of a photon within the first predetermined wavelength band, and a second state wherein the receipt of an electron having the predetermined energy causes no emission of a photon in the first predetermined wavelength band. Numeric values, such as a '1' and a '0' may be associated with each of these states. For purposes of illustration, the embodiments will be discussed herein as if a '1' is associated with the first state and a '0' is associated with the second state, but it will be apparent that a system could associate either value, or indeed any value, with either such state.

Figure 1B:
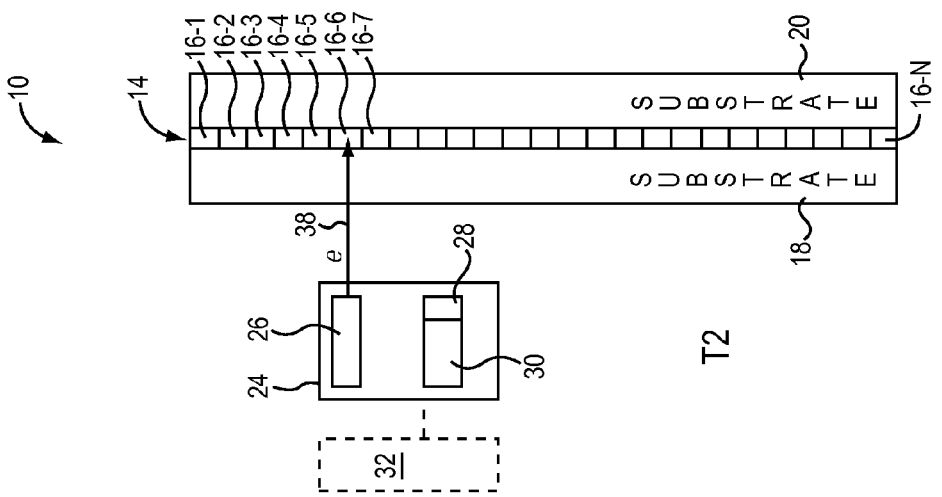
Figure 1A:
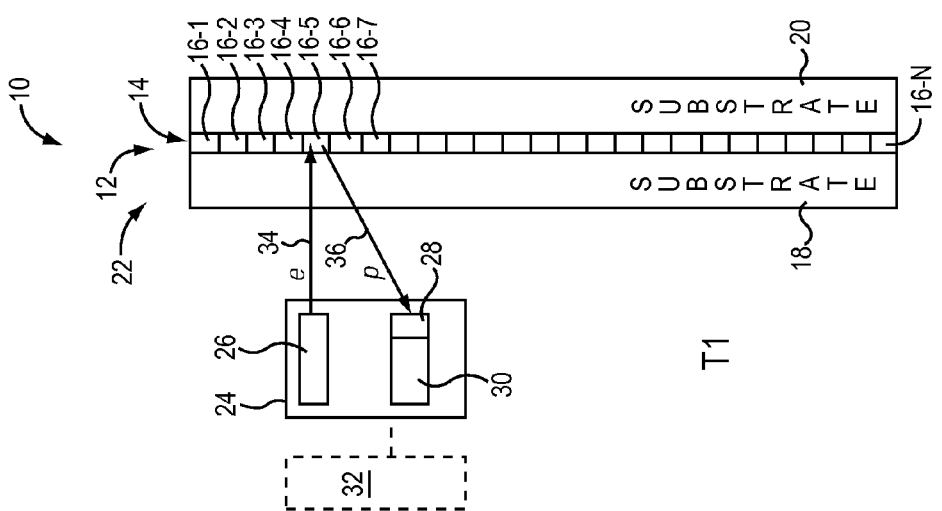

FIGS. 1A-1C are block diagrams of an environment 10 in which an electron-activated photon emission material 12 is illustrated as being read at three successive periods of time, according to one embodiment. Mechanisms for encoding data on the electron-activated photon emission material 12 will be discussed in conjunction with FIGS. 3 and 4. Referring first to FIG. 1A, the electron-activated photon emission material 12 comprises a first layer 14 of a plurality of nanoparticles 16. The nanoparticles 16 may comprise any suitable electroluminescent material, including, but not limited to, phosphor, and in particular phosphor crystals, such as micro-nano crystal phosphor complexes, nanotubes, fluorophores, frequency-shift phosphors, and the like. Suitable electroluminescent materials may be organic or inorganic. Additional examples include ZnS:Mn with yellow-orange emission, powdered zinc sulfide doped with copper (producing greenish light) or silver (producing bright blue light), thin-film zinc sulfide doped with manganese (producing orange-red light), naturally blue diamond, which includes a trace of boron that acts as a dopant, and semiconductors containing Group III and Group V elements, such as indium phosphide (InP), gallium arsenide (GaAs), and gallium nitride (GaN), as well as certain organic semiconductors, such as [Ru(bpy)3]2+(PF6−)2, where bpy is 2,2'-bipyridinesa. In some embodiments, the electroluminescent materials may include a rare-earth metal complex. The first layer 14 may comprise any suitable thickness. In some embodiments, the thickness is between about 1 micron and 10 microns.

The first layer 14 may be adhered, affixed, or otherwise sandwiched between a first planar substrate layer 18 and a second planar substrate layer 20 of a storage structure 22, in one embodiment. The first planar substrate layer 18 is transparent to electrons of a predetermined energy, and to photons in a first predetermined wavelength band. The first planar substrate layer 18 is optional, but advantages of the use of the first planar substrate layer 18 in conjunction with the second planar substrate layer 20, among other features, is that the two planar substrate layers 18, 20 provide a suitably rigid storage structure 22 for manufacture and distribution of the electron-activated photon emission material 12, and to otherwise protect the electron-activated photon emission material 12.

The storage structure 22 may have substantially planar sides, and may be any desired geometric shape, such as a circular or a rectangular shape. In one embodiment, data, as discussed briefly above and in greater detail herein, may be encoded in the nanoparticles 16 of the electron-activated photon emission material 12 as either a '1' or '0' (e.g., on or off, respectively, or vice-versa) according to whether that respective nanoparticle 16 emits or does not emit optical energy, in the form of a photon in a first predetermined wavelength band, when the respective nanoparticle 16 receives an electron having a first predetermined energy. In particular, the nanoparticles 16 in the first layer 14 are engineered, or otherwise configured, to be altered to emit a photon within a first predetermined wavelength band upon receipt of an electron having a first predetermined energy. The first predetermined energy is the energy sufficient to cause the emission of a photon in the respective nanoparticle 16, if such respective nanoparticle 16 has been suitably altered to encode data. Electrons having lower or higher energies, due to the quantum nature of electron excitement and photon emission, will pass through the respective nanoparticle 16 without causing the emission of a photon. The emission of a photon may be interpreted to be a value of '1,' or any other predetermined value. A failure of the respective nanoparticle 16 to emit a photon in the first predetermined wavelength band within a predetermined period of time may be interpreted as a value of '0,' or any other predetermined value.

While for purposes of illustration the embodiments are described as emitting, or otherwise directing, a single electron toward a respective nanoparticle 16, in some embodiments multiple electrons having the first predetermined energy may be successively streamed toward the nanoparticle 16 during a predetermined period of time. If, during that predetermined period of time, the respective nanoparticle 16 emits one or more photons in the first predetermined wavelength band, it may be interpreted that a value of '1' has been encoded in the respective nanoparticle 16. If no photons are emitted by the nanoparticle 16 during the predetermined period of time, it may be interpreted that a value of '0' has been encoded in the respective nanoparticle 16.

As will be described in greater detail herein, the electron-activated photon emission material 12 may comprise multiple layers of nanoparticles, and each layer may comprise a different composition, such that each layer may emit a photon in a different predetermined wavelength band upon receipt of an electron having a particular predetermined energy. Different data may be encoded in each separate layer of the electron-activated photon emission material 12.

The environment 10 includes a system 24 for reading data from the storage structure 22. The system 24 includes an electron source 26 that is configured to emit one or more electrons having a first predetermined energy at the electron-activated photon emission material 12. The electron source 26 may comprise one or more micro cathode ray tubes (CRTs), a diffracting single electron source, or any other electron source mechanism. The electron source 26 may include a steering, or directing, mechanism that facilitates orienting the electron source 26 at a particular nanoparticle 16. The steering mechanism may use any desired electron steering technique, such as via an electromagnetic field, as is done in electron microscopes. The electron source 26 may also be coupled to, or include, a gross adjustment mechanism (not illustrated), such as a mechanical arm, that allows the electron source 26 to be rapidly moved to any particular area of the storage structure 22. The energy of the electrons may be about the same as the energy of the photons used to excite the phosphor bands (about 0.5-to about 2 eV, in some embodiments). In one embodiment, the electrons may be generated using a micro CRT. The electrons may be directed via the plates of such a micro CRT to specific locations on the electron-activated photon emission material 12 and strike desired nanoparticles 16 in the electron-activated photon emission material 12.

In some embodiments, the electron source 26 may include multiple electron sources 26 arranged in an array, such as a multi-dimensional array of micro CRTs, facilitating parallel readout of data from the storage structure 22. The system 24 includes an optical detector, such as a sensor 28, that is configured to determine a photonic response of a particular nanoparticle 16 upon the receipt of an electron by the particular nanoparticle 16. The sensor 28 may be coupled to a controller 30 that is configured to interpret the photonic response as a numeric value, such as a '1' or a '0.' The sensor 28 may comprise any suitable detector element or array of elements that are configured to sense photons in the predetermined wavelength band of the photons emitted by the nanoparticles 16. If the predetermined wavelength band comprises a wavelength in the visible spectrum, or the near infrared spectrum, the sensor 28 may comprise, for example, a 32×32 detector element complementary metal-oxide semiconductor (CMOS) optical image sensor. If the predetermined wavelength band is in the infrared spectrum, the sensor 28 may comprise, for example, a focal plane array. The system 24 may be coupled to or integrated with another system 32, which might comprise, for example, a desktop computer, laptop computer, or any other device that may benefit from an ability to read data from a storage medium.

Figure 2:
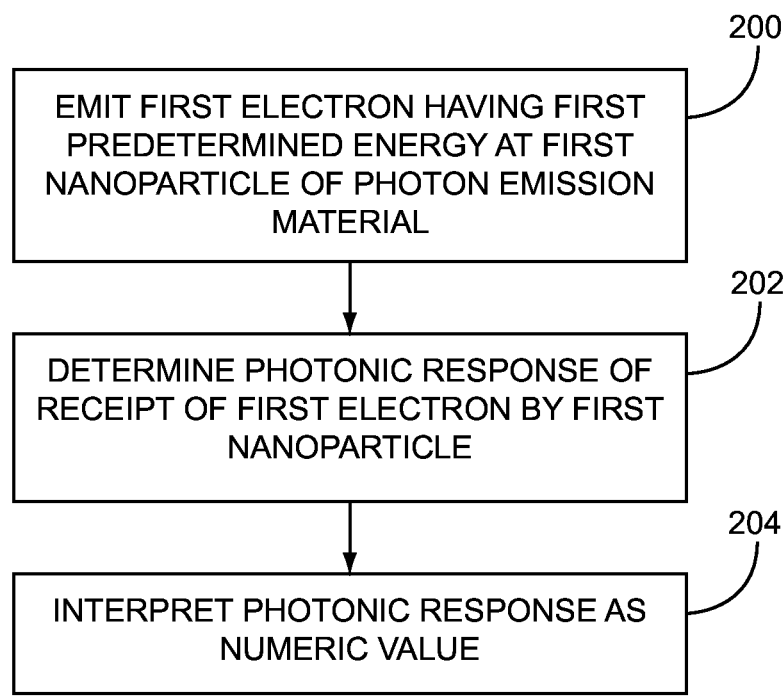
FIG. 2 is a flowchart of a process for reading data stored on the electron-activated photon emission material according to one embodiment.

FIG. 2 is a flowchart of a method for obtaining data from an electron-activated photon emission material according to one embodiment, and will be discussed in conjunction with FIGS. 1A-1C. Initially, the electron source 26 is oriented to a nanoparticle 16-5 of the layer 14. This orientation, as discussed above, may involve a gross adjustment by a mechanical mechanism, such as a mechanical arm, or the like, that moves the electron source 26 to a location with respect to the storage structure 22 such that a fine adjustment steering mechanism, such as the use of an electromagnetic field, facilitates the emission of an electron toward the nanoparticle 16-5.

At a time T1, the electron source 26 emits an electron 34 having a first predetermined energy at the nanoparticle 16-5 of the electron-activated photon emission material 12 (FIG. 2, block 200). The sensor 28 determines a photonic response of the receipt of the electron 34 by the nanoparticle 16-5. In this example, assume that the photonic response is the receipt, by the sensor 28, of a photon 36 in a predetermined wavelength band from the nanoparticle 16-5 within a predetermined period of time (FIG. 2, block 202). The particular predetermined period of time may be design dependent and, in part, may depend on the composition of the particular nanoparticle 16 that is being read. For example, a nanoparticle 16 may emit fluorescence or may emit phosphorescence, and activation lifetimes can vary for fluorescence from between about 100 nanoseconds to about 100 microseconds, and for phosphorescence from between about 1 microsecond to about 1000 microseconds. These ranges are merely examples, and the embodiments are not limited to any particular activation lifetimes. The emission lifetimes can likewise vary. The emission lifetime may vary for fluorescence from between about 1 microsecond to about 1000 microseconds, and for phosphorescence from between about 10 microseconds to thousands of seconds. These ranges are merely examples, and the embodiments are not limited to any particular emission lifetimes.

While the embodiments are discussed herein in the context of the receipt (or emission) of a single photon for the purposes of illustration, in some embodiments, a nanoparticle 16 may receive a stream of electrons during the predetermined period of time and, thus, may emit multiple photons in a predetermined wavelength band. In such embodiments, the receipt of one photon in the predetermined wavelength band or multiple photons in the predetermined wavelength band may be interpreted to be a particular numeric value, such as a '1.'

In some embodiments, it may be desirable to have a relatively fast activation lifetime and a relatively limited emission lifetime. For example, an activation lifetime of about a 1 microsecond and an emission lifetime of about 100 microseconds may be desirable. In such embodiment, the predetermined period of time may be about 100 microseconds.

The controller 30 interprets the photonic response as a numeric value (FIG. 2, block 204). For example, the controller 30 may interpret the receipt of the photon 36 in the predetermined wavelength band from the nanoparticle 16-5 within the predetermined period of time as a '1,' or may interpret it as a '0,' depending on the protocol established for encoding and reading data utilized by the system 24 and the storage structure 22. Assume that the photon 36 is within the predetermined wavelength band, and that the controller 30 interprets the receipt of the photon to mean that a value of '1' is stored in the nanoparticle 16-5.

FIG. 1B is a block diagram of the environment 10 at a time T2. The system 24 is adjusted to read the nanoparticle 16-6. This may involve both a gross adjustment and a fine adjustment, or, in some embodiments, a fine adjustment may be sufficient to read multiple nanoparticles 16 that are in close proximity to one another. The electron source 26 emits an electron 38 having the first predetermined energy at the nanoparticle 16-6 of the electron-activated photon emission material 12. The sensor 28 determines a photonic response of the receipt of the electron by the nanoparticle 16-6. For purposes of illustration, assume that the nanoparticle 16-6 emits no photon in response to the receipt of the electron 38 from the electron source 26. Assume further that the controller 30 interprets the lack of emission of a photon within the predetermined wavelength band as a numeric value of '0.'

FIG. 1C is a block diagram of the environment 10 at a time T3. The system 24 is again adjusted to read the nanoparticle 16-7. Again, this may involve both a gross adjustment and a fine adjustment, or, in some embodiments, a fine adjustment may be sufficient to read multiple nanoparticles 16 that are in close proximity to one another. The electron source 26 emits an electron 40 having the first predetermined energy at the nanoparticle 16-7 of the electron-activated photon emission material 12. The sensor 28 determines a photonic response of the receipt of the electron 40 by the nanoparticle 16-7. For purposes of illustration, assume that the nanoparticle 16-7 emits a photon 42 within the predetermined wavelength band in response to the receipt of the electron 40 from the electron source 26. The controller 30 interprets the receipt of the photon 42 to mean that a value of '1' is stored in the nanoparticle 16-7. Thus, the values encoded in the three nanoparticles 16-5-16-7 are '1,' '0' and '1,' respectively.

FIG. 3 is a block diagram of a portion of a multiple-layer electron-activated photon emission material 12-1 according to another embodiment. In this embodiment, the electron-activated photon emission material 12-1 comprises two layers of nanoparticles: a first layer 44 of nanoparticles 46, and a second layer 48 of nanoparticles 50. In practice, the second layer 48 may be positioned adjacent to and immediately behind the first layer 44, but the first layer 44 and the second layer 48 are illustrated separately for purposes of discussion. The nanoparticles 46, 50 are substantially similar to the nanoparticles 16, except as otherwise discussed herein. In particular, the nanoparticles 46, 50 comprise nanoparticles having a lattice structure capable of being altered to emit a photon within a predetermined wavelength band upon receipt of an electron having a predetermined energy. In some embodiments, a width 52 of the nanoparticles 46, 50 comprises approximately 20 nm to 50 nm.

FIG. 4 is a sectional view of the electron-activated photon emission material 12-1 taken along line 4 of FIG. 3. For purposes of illustration, assume that the nanoparticles 46 in the first layer 44 of the electron-activated photon emission material 12-1 are engineered, or otherwise configured, to be alterable to emit a photon within a first predetermined wavelength band upon receipt of an electron having a first predetermined energy. Assume further that the nanoparticles 50 in the second layer 48 of the electron-activated photon emission material 12-1 are engineered, or otherwise configured, to be alterable to emit a photon within a second predetermined wavelength band upon receipt of an electron having a second predetermined energy. Finally, assume that data has been encoded in the electron-activated photon emission material 12-1. The nanoparticles 46-1-46-6 and 50-1-50-6 may be read in the following manner, according to one embodiment. The system 24 (FIG. 1) is positioned or otherwise oriented such that an electron 54 having the first predetermined energy is emitted at the nanoparticle 46-1. In response to the receipt of the electron 54, the nanoparticle 46-1 emits a photon 56 in the first predetermined wavelength band, which, in this example, is a band of wavelengths centered at about 650 nanometers (red), for example. The controller 30 (FIG. 1) interprets the receipt of the photon 56 in the first predetermined wavelength band by the sensor 28 (FIG. 1) as meaning a value of '1' has been encoded in the nanoparticle 46-1.

The system 24 may next emit an electron 58 having the second predetermined energy at the nanoparticle 50-1. In response to the receipt of the electron 58, the nanoparticle 50-1 emits a photon 60 in the second predetermined wavelength band, which in this example, is a band of wavelengths centered at about 450 nanometers (blue), for example. The controller 30 interprets the receipt of the photon 60 in the second predetermined wavelength band by the sensor 28 as meaning a value of '1' has been encoded in the nanoparticle 50-1.

Notably, the system 24 did not need to be reoriented to read data from the second layer 48, because the electron 58 merely passes through the nanoparticle 46-1 in the first layer 44. Thus, data can be stored both horizontally across each layer 44, 48, as well as vertically among the multiple layers 44 and 48. While for purposes of illustration the electron-activated photon emission material 12-1 is illustrated as comprising only two layers 44, 48, the embodiments are not limited to any particular number of layers, and in other embodiments, the electron-activated photon emission material 12-1 may have any number of layers of nanoparticles, each of which may be engineered to emit a photon in a particular wavelength band upon receipt of an electron having a corresponding particular energy.

The system 24 may next, or ultimately, be positioned or otherwise oriented such that an electron 62 having the first predetermined energy is emitted at the nanoparticle 46-3. In response to the receipt of the electron 62, the nanoparticle 46-3 emits no photon within a predetermined period of time. The controller 30 interprets the lack of receipt of a photon in the first predetermined wavelength band by the sensor 28 as meaning a value of '0' has been encoded in the nanoparticle 46-3.

The system 24 may next emit an electron 64 having the second predetermined energy at the nanoparticle 50-3. In response to the receipt of the electron 64, the nanoparticle 50-3 emits a photon 66 in the second predetermined wavelength band. The controller 30 interprets the receipt of the photon 66 in the second predetermined wavelength band by the sensor 28 as meaning a value of '1' has been encoded in the nanoparticle 50-3. Again, note that the system 24 need not be repositioned after reading the nanoparticle 46-3 in order to read the nanoparticle 50-3. The system 24 may read the nanoparticles 46-5 and 50-5 similarly.

Figure 5:
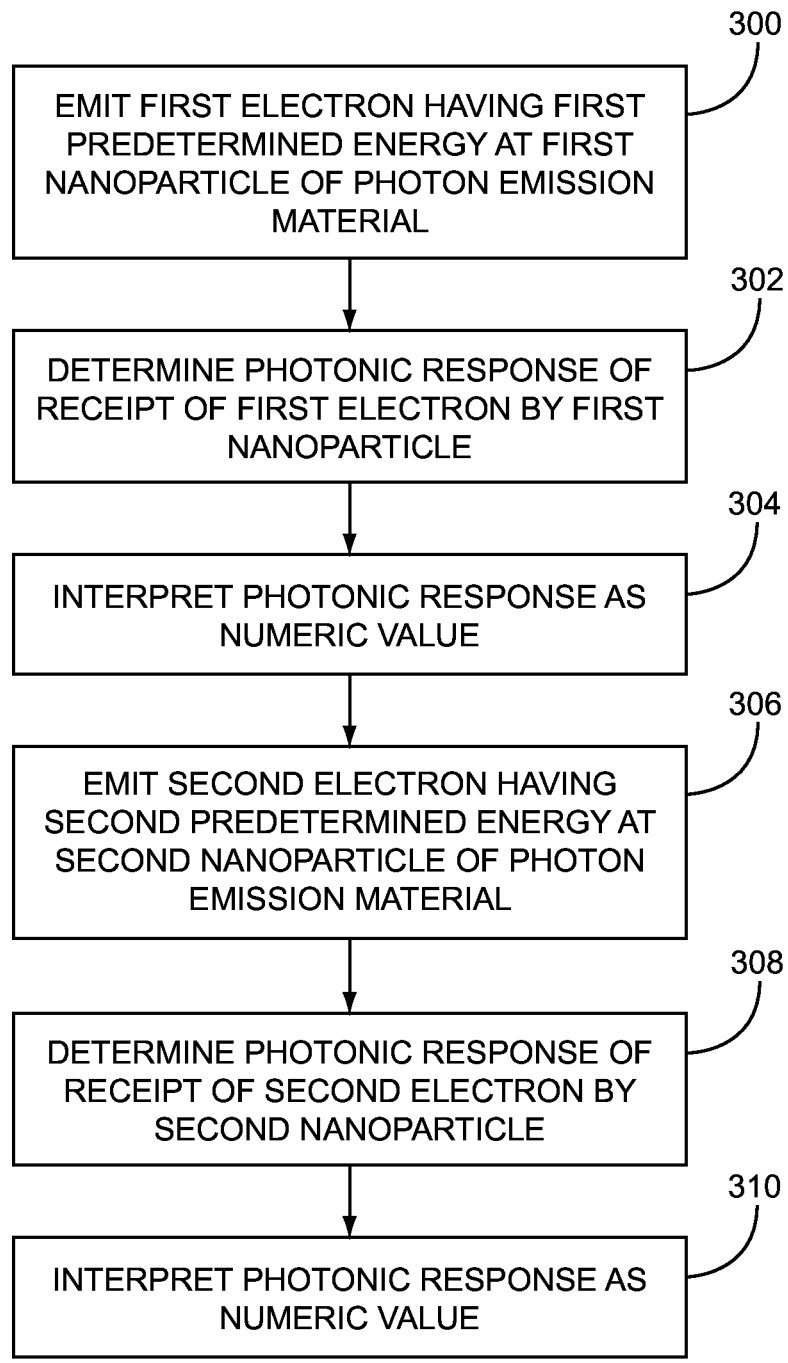
FIG. 5 is a flowchart of a method for reading a multiple layer material electron-activated photon emission material according to one embodiment.

FIG. 5 is a flowchart of a method for reading the multiple layer electron-activated photon emission material 12-1 according to one embodiment. FIG. 5 will be discussed in conjunction with FIG. 4. The system 24 emits the electron 54 having the first predetermined energy at the nanoparticle 46-1 (FIG. 5, block 300). The sensor 28 determines the photonic response of the receipt of the electron 54 by the nanoparticle 46-1 (FIG. 5, block 302). The controller 30 interprets the photonic response, in this case, the receipt of the photon 56 in the first predetermined wavelength band, as a numeric value of '1' (FIG. 5, block 304). The system 24 then emits the electron 58 having the second predetermined energy at the nanoparticle 50-1 (FIG. 5, block 306). The sensor 28 determines the photonic response of the receipt of the electron 58 by the nanoparticle 50-1 (FIG. 5, block 308). The controller 30 interprets the photonic response, in this case, the receipt of the photon 60 in the second predetermined wavelength band, as a numeric value of '1' (FIG. 5, block 310).

Figure 6:
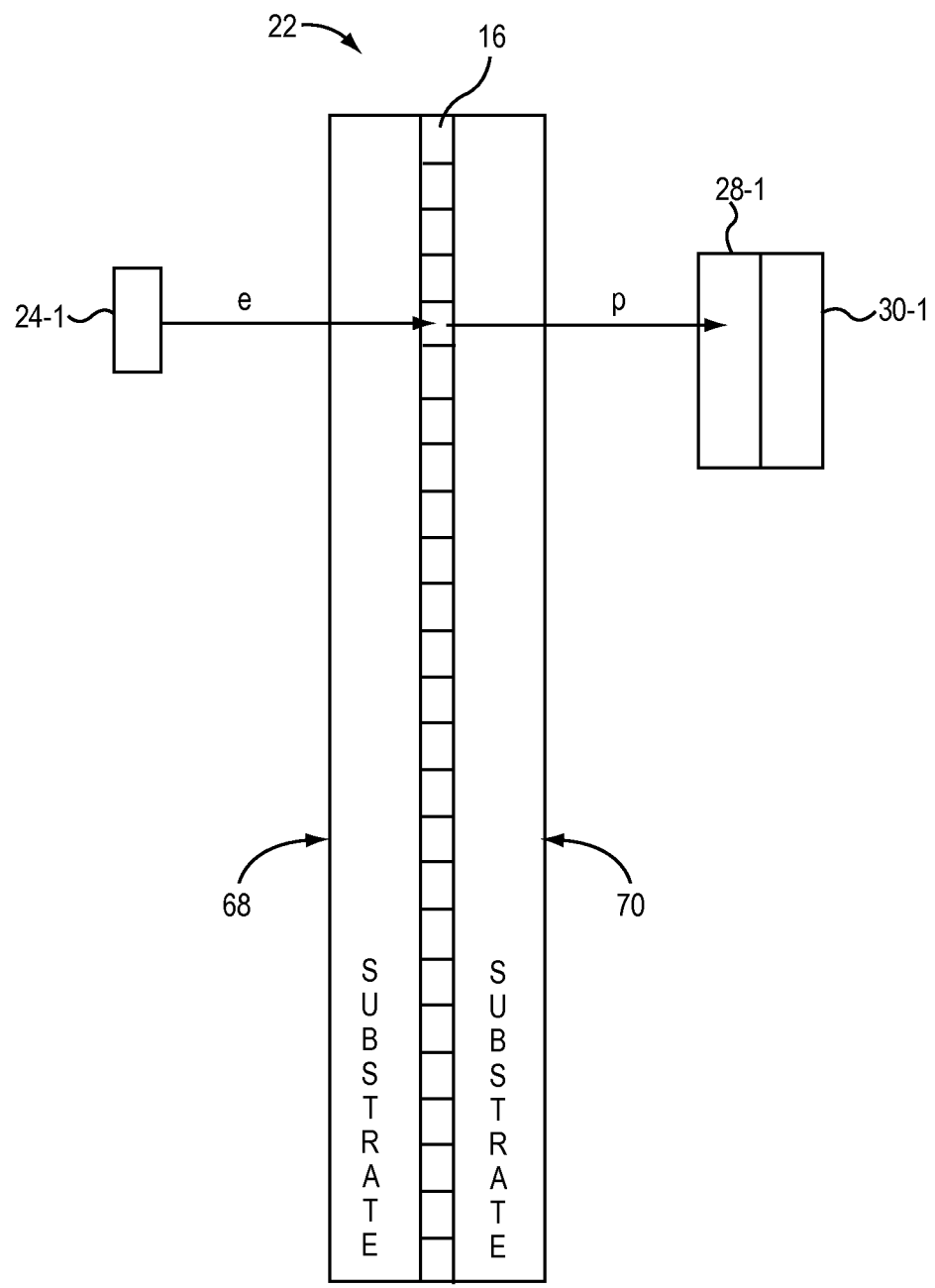
FIG. 6 is a block diagram illustrating a system according to another embodiment.

In the embodiments illustrated in FIGS. 1-5, the electron source 26 and sensor 28 of the system 24 are illustrated as operating from the same side of the storage structure 22. FIG. 6 is a block diagram illustrating a system 24-1 according to another embodiment. In this embodiment, an electron source 26-1 is positioned facing a first side 68 of the electron-activated photon emission material 12, and a sensor 28-1 is positioned facing a second side 70 of the electron-activated photon emission material 12. The controller 30-1 is illustrated as being on the second side 70, but may be positioned in any location, so long as the controller 30-1 is communicatively coupled to the sensor 28-1. Other than being located on different sides of the electron-activated photon emission material 12, the system 24-1 operates the same as discussed above. As the system 24-1 moves to a particular area of the storage structure 22, the electron source 26-1 is positioned on the first side 68 with respect to a particular nanoparticle 16, and the sensor 28-1 is positioned on the second side 70 with respect to the same nanoparticle 16.

Data encoded in the electron-activated photon emission material 12 may be addressed in any known or desired manner. In some embodiments, bit-encode or sparse address encoding techniques may be utilized. In some embodiments, addressing tables, and/or addressing bits identifying particular locations within the electron-activated photon emission material 12 may be stored at known locations to facilitate retrieval of data from the electron-activated photon emission material 12.

Figure 7:
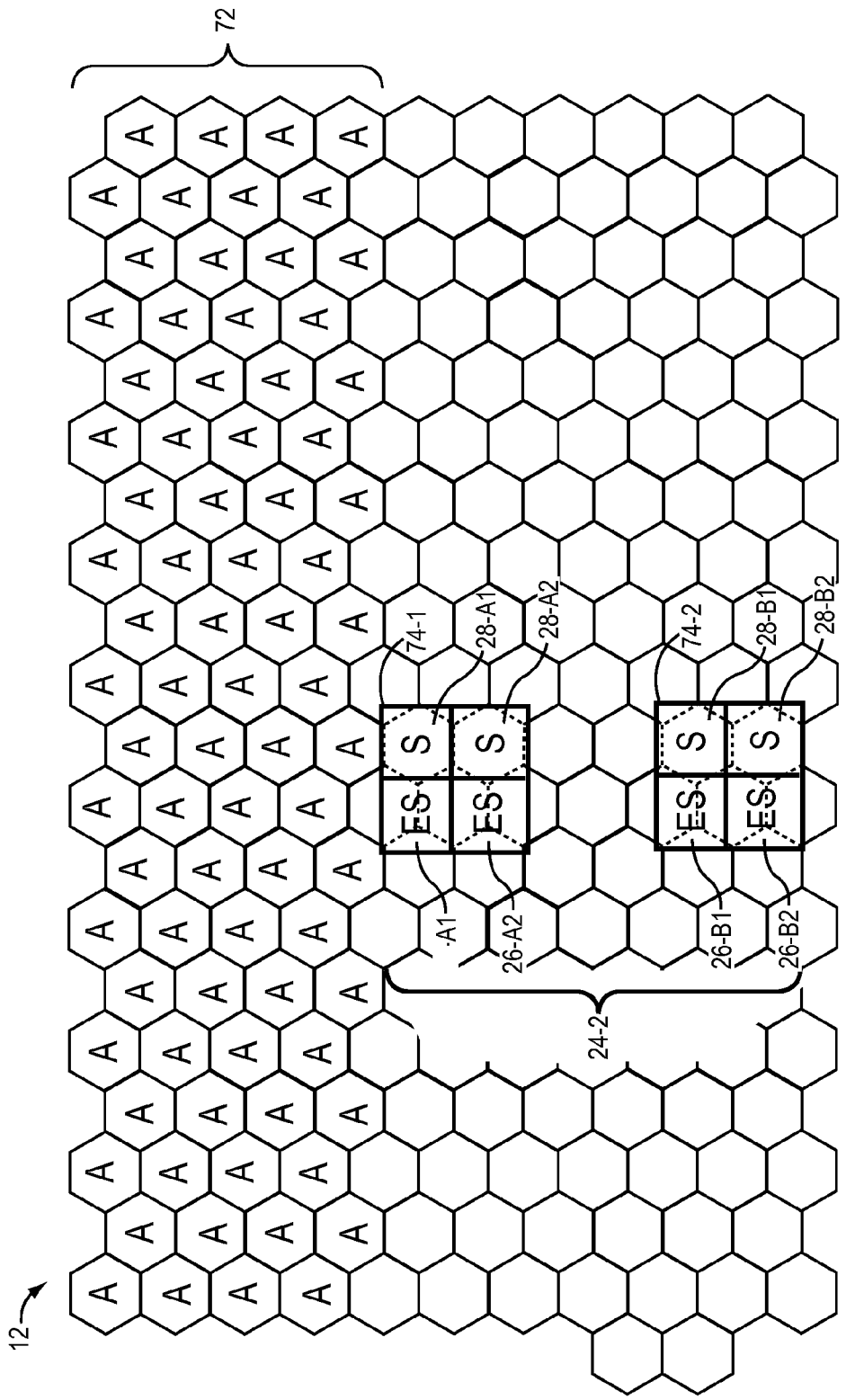
FIG. 7 is a block diagram illustrating an addressing scheme and a parallel reading scheme according to one embodiment.

FIG. 7 is a block diagram illustrating an addressing scheme and a parallel reading scheme according to one embodiment. In this embodiment, addressing information is stored at known locations 72. The letter "A" represents bits of information that identify a particular address of the nanoparticles at such location. Thus, the system 24 may first scan and read the addresses from the locations 72 to determine the particular nanoparticles 16 that contain the desired data. The locations 72 of the addressing information may be predetermined based on system design, or may be identified by data stored in a predetermined location on the electron-activated photon emission material 12.

In this embodiment, a system 24-2 comprises two reading heads 74-1 and 74-2 (generally, reading heads 74), each of which contains two electron sources and two sensors. The reading head 74-1 includes electron sources 26-A1 and 26-A2, and sensors 28-A1 and 28-A2, and the reading head 74-2 includes electron sources 26-B1 and 26-B2, and sensors 28-B1 and 28-B2. For purposes of illustration, controllers 30 are not shown. Each reading head 74 may read nanoparticles concurrently, in parallel. The reading head 74-1 may be mechanically coupled to the reading head 74-2, such that the distance between the two reading heads 74 remains fixed during operation, or, in alternative embodiments, the two reading heads 74 may be moved independent of one another. While for purposes of illustration the reading heads 74 are illustrated as having only two electron sources 26 and sensors 28, the embodiments are not so limited, and may comprise any number of electron sources 26 and sensors 28.

In a multiple-layer electron-activated photon emission material 12, such as the electron-activated photon emission material 12-1 illustrated with regard to FIG. 3, each reading head 74 may concurrently read the same layer, or each reading head 74 may concurrently read different layers. For example, referring briefly to FIG. 3, at one point in time the reading head 74-1 may concurrently read nanoparticles 46-1 and 46-2, and the reading head 74-2 may concurrently read nanoparticles 46-5 and 46-6, for example. At another point in time, the reading head 74-1 may concurrently read nanoparticles 50-1 and 50-2, and the reading head 74-2 may concurrently read nanoparticles 50-4 and 50-5, for example.

Figure 8:
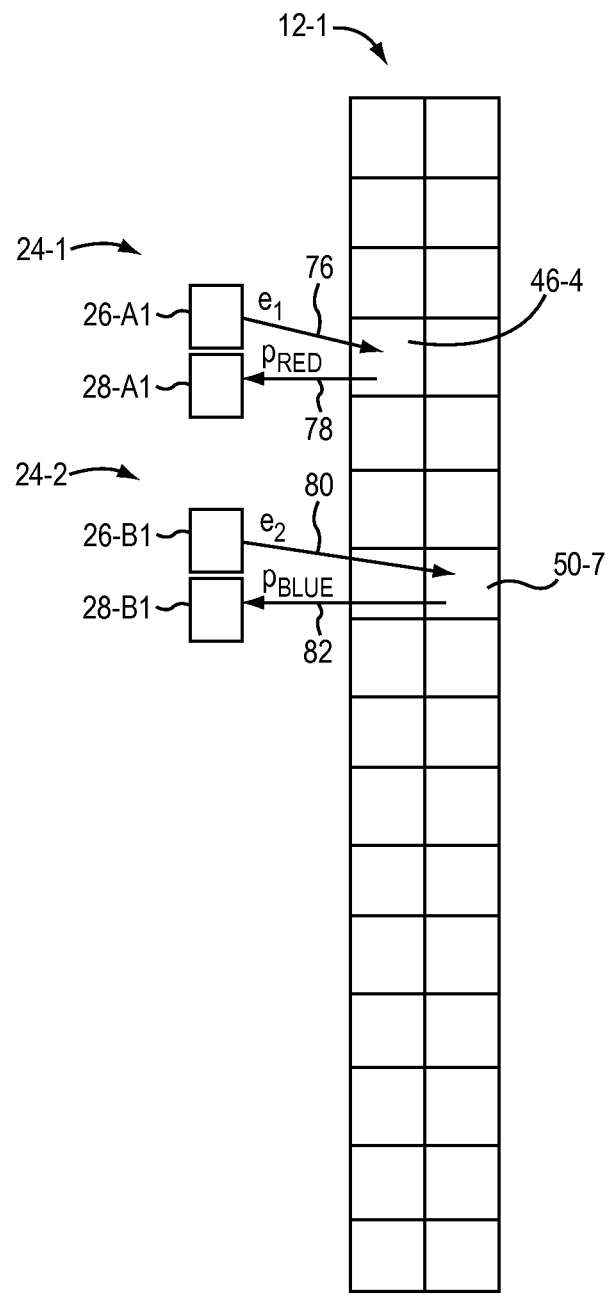
FIG. 8 is a block diagram illustrating the system shown in FIG. 7 in operation during a parallel reading operation.

FIG. 8 is a block diagram illustrating the system 24-2 shown in FIG. 7 in operation during a parallel reading operation. In this example, the system 24-2 is operable to read information from a multiple-layer electron-activated photon emission material 12, such as the electron-activated photon emission material 12-1 discussed with regard to FIG. 3. The system 24-2 emits a first electron 76 having the first predetermined energy at a first nanoparticle 46-4. The sensor 28-A1 determines the photonic response of the receipt of the first electron 76 having the first predetermined energy by the first nanoparticle 46-4. A controller associated with the sensor 28-A1 (not illustrated) interprets the photonic response, in this case, the receipt of a first photon 78 in the first predetermined wavelength band, as a numeric value of '1.' Substantially concurrently, the system 24-2 emits a second electron 80 having the second predetermined energy at a second nanoparticle 50-7. A controller associated with the sensor 28-B1 (not illustrated) determines the photonic response of the receipt of the second electron 80 by the second nanoparticle 50-7. The controller interprets the photonic response, in this case, the receipt of a second photon 82 in the second predetermined wavelength band, as a numeric value of '1.'

Figure 9:
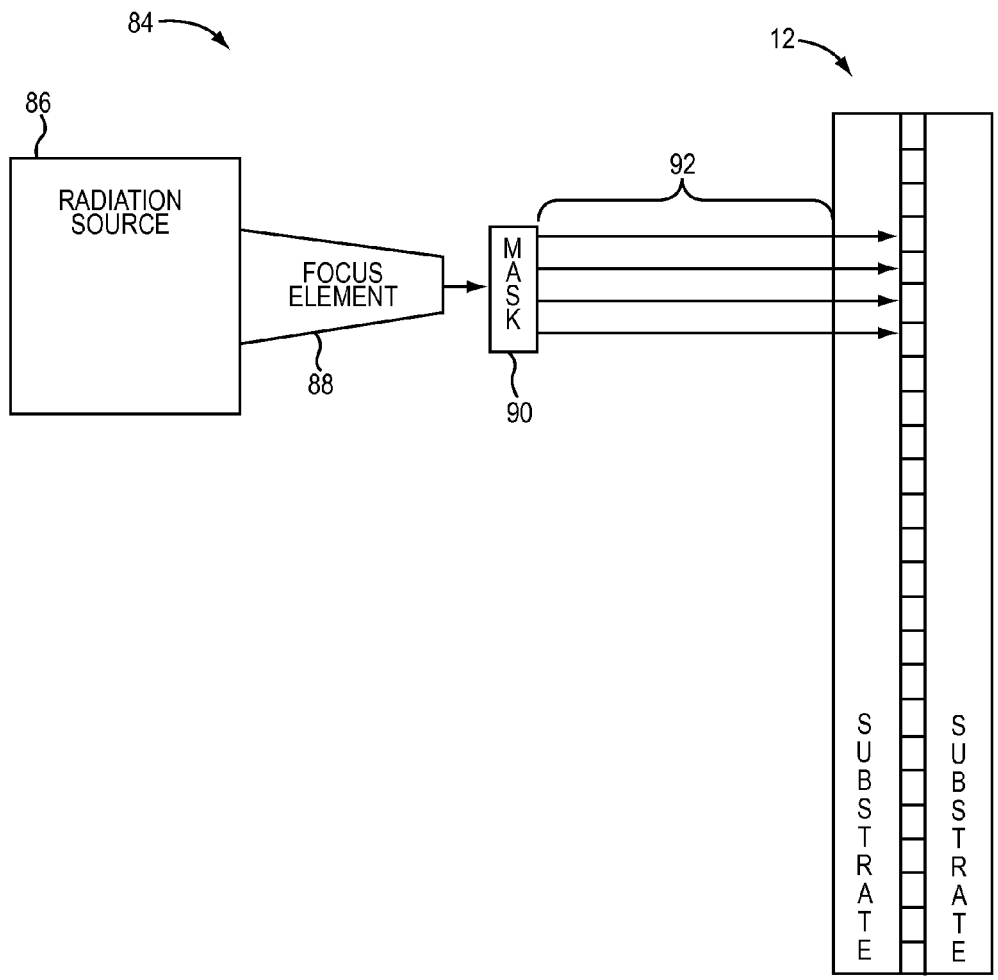
FIG. 9 is a block diagram of a system suitable for encoding data onto the electron-activated photon emission material according to one embodiment.

FIG. 9 is a block diagram of a system 84 suitable for encoding data onto the electron-activated photon emission material 12 according to one embodiment. In this embodiment, portions of the electron-activated photon emission material 12 may be encoded as desired. The system 84 includes a radiation source 86 that is configured to generate radiation, such as X-ray radiation, ultraviolet (UV) radiation, electron radiation, or other suitable radiation. The emitted radiation passes through a focus element 88 and strikes a mask 90. The mask 90 directs a desired pattern 92 of radiation onto the electron-activated photon emission material 12. The pattern 92 is formed based on the data that is to be stored on the electron-activated photon emission material 12, and may comprise any desired data, such as video data, audio data, or the like. The radiation "damages" or "pre-pumps" the electron-activated photon emission material 12 in accordance with the pattern 92, and thereby encodes the desired data onto the electron-activated photon emission material 12.

Figure 10:
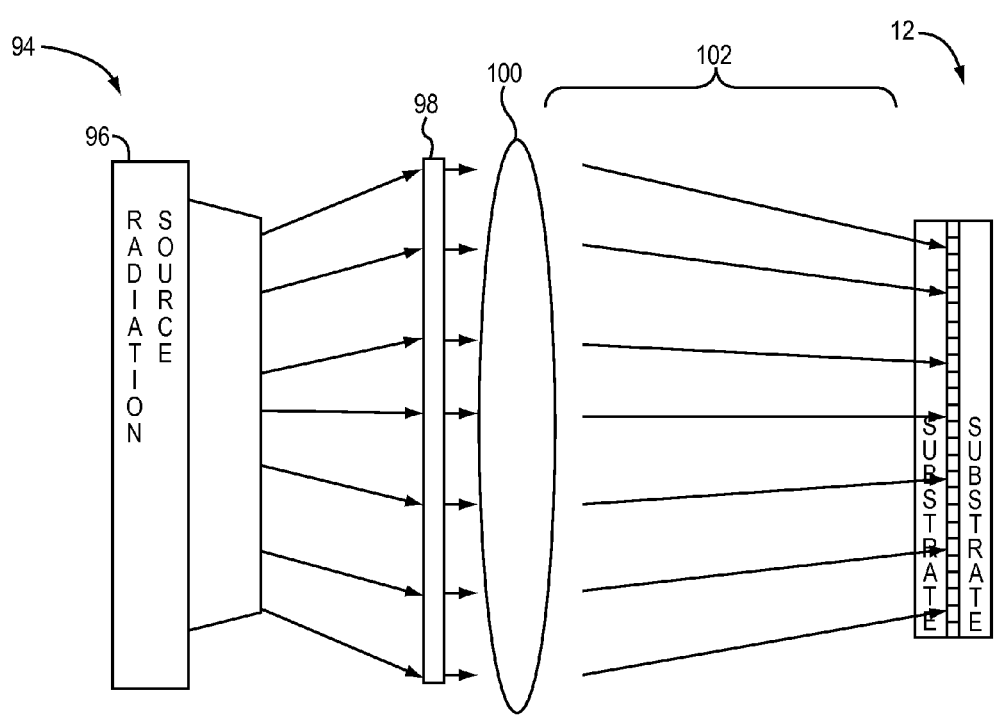
FIG. 10 is a block diagram of a system suitable for storing or otherwise encoding data onto the electron-activated photon emission material according to another embodiment.

FIG. 10 is a block diagram of a system 94 suitable for storing or otherwise encoding data onto the electron-activated photon emission material 12 according to another embodiment. The system 94 includes a radiation source 96 that is configured to generate radiation, such as X-ray radiation, UV radiation, electron radiation, or other suitable radiation. The emitted radiation is directed through a mask 98, and a focus element 100, where a desired pattern 102 of radiation is directed onto the electron-activated photon emission material 12. The mask 98 and focus element 100 may comprise a single component or multiple components. In this embodiment, the pattern 102 may encompass the entire electron-activated photon emission material 12, and may comprise any desired data, such as video data, audio data, or the like. The radiation "damages" or "pre-pumps" the electron-activated photon emission material 12 in accordance with the pattern 102, and thereby encodes the desired data onto the electron-activated photon emission material 12.

In other embodiments, data may be stored on the electron-activated photon emission material 12 on a bit-by-bit basis via use of a radiation source and a microscope.

In other embodiments, chemical mechanisms may be used to store data on the electron-activated photon emission material 12. For example, molecular changes of the electron-activated photon emission material 12 may be induced via oxidation via an increased flux of electrons at crystal host resonances.

In some embodiments, electrons may be directed at the electron-activated photon emission material 12 at a particular velocity to achieve a desired energy of the respective electrons. Notably, in one embodiment, the electron-activated photon emission material 12 does not move, or spin, during operation and remains still with respect to the electron source 26.

The embodiments facilitate a relatively dense storage structure 22. Because electrons are used to read the data encoded in the nanoparticles, the electrons can address relatively small extents, such as single nanometer size areas. In some embodiments, the electrons may be focused, and in other embodiments, the electrons are not focused. The electrons may be emitted in multiple streams, or beams, of electrons in parallel to facilitate multiplexed readout.

In contrast to conventional optical storage mediums and mechanisms, the present embodiments offer numerous advantages, including, but not limited to, the use of relatively small "bit" storage size, such as approximately 10-100 nm phosphor crystals. Multi-band (color) output may be used to multiplex the storage of information on the electron-activated photon emission material 12, as discussed above. Thus, each different photon color, or different wavelength (including different bands in each of ultraviolet, visible, and infrared wavelengths), that the electron-activated photon emission material 12 is capable of emitting may comprise a different storage layer. Electron energies may be varied through acceleration to read particular storage layers. Micro CRTs, or other electron sources, may address extremely small storage units using, for example, micro CRT steering plates. Information density may increase in part by the approximately ten to thirty times reduction in bit-site size, as well as the ability to multiplex three to six times more data using different colors within a nanoparticle as different storage layers. Thus, the electron-activated photon emission material 12 may be able to store many terabytes of data rather than gigabytes.

Additional applications of the embodiments disclosed herein include, but are not limited to, customized storage with encryption/encoding through custom layers; dual storage disks, one layer with a traditional readout (e.g., Blu-Ray™), and a second layer with the electron-activated optical emission layer; and extremely dense, small disposable storage (such as, for example, a USB thumb drive) without the need for spinning or otherwise moving parts.

In some embodiments, the electron-activated photon emission material 12 may comprise a photon conversion material, as disclosed in U.S. patent application Ser. No. 13/891,692 filed on May 10, 2013, which is hereby incorporated by reference herein. The use of such photon conversion material may be useful for facilitating photon emission in the visible spectrum, near-infrared spectrum, or ultraviolet spectrum.

Those skilled in the art will recognize improvements and modifications to the preferred embodiments of the present disclosure. All such improvements and modifications are considered within the scope of the concepts disclosed herein and the claims that follow.

What is claimed is:

1. A method for obtaining data, comprising:
    emitting, by a first electron source, a first electron having a first predetermined energy at a first nanoparticle of a photon emission material comprising a first layer of a plurality of nanoparticles;
    determining a first photonic response of the receipt of the first electron by the first nanoparticle that comprises one of a photon-received response and a photon-nonreceived response; and
    interpreting the first photonic response as a first binary numeric value if the first photonic response comprises the photon-received response and as a second binary numeric value that differs from the first binary numeric value if the first photonic response comprises the photon-nonreceived response.

2. The method of claim 1, wherein the photon-received response is determined based on receiving, by a sensor, a photon in a predetermined wavelength band within a predetermined period of time.

3. The method of claim 2, wherein the sensor comprises a 32×32 detector element image sensor.

4. The method of claim 1, wherein the photon-nonreceived response is determined based on receiving no photon in a predetermined wavelength band within a predetermined period of time.

5. The method of claim 1, wherein the plurality of nanoparticles comprise one of a phosphor, a nanocrystal, a fluorophore, a nanotube, and a micro-nano crystal phosphor complex.

6. The method of claim 1, further comprising:
    emitting, by the first electron source, a second electron having a second predetermined energy at a second nanoparticle of a plurality of nanoparticles in a second layer that is behind the first layer;

determining a second photonic response of the receipt of the second electron by the second nanoparticle that comprises one of the photon-received response and the photon-nonreceived response; and interpreting the second photonic response as the first binary numeric value if the second photonic response comprises the photon-received response and as the second binary numeric value if the second photonic response comprises the photon-nonreceived response.

7. The method of claim 6, wherein the plurality of nanoparticles in the first layer comprises a different composition from the plurality of nanoparticles in the second layer.

8. The method of claim 1, further comprising:
concurrently emitting, by a plurality of electron sources, including the first electron source, a plurality of electrons, including the first electron, having the first predetermined energy at a group of nanoparticles in the first layer;
determining photonic responses of the receipt of the plurality of electrons by the group of nanoparticles that comprise one of the photon-received response and the photon-nonreceived response; and
interpreting the photonic responses as numeric values.

9. The method of claim 1, further comprising:
orienting a second electron source at the photon emission medium;
emitting, by the second electron source concurrently with the emission of the first electron by the first electron source, a second electron having the first predetermined energy at a second nanoparticle of the plurality of nanoparticles in the first layer;
determining a second photonic response of the receipt of the second electron by the second nanoparticle that comprises one of the photon-received response and the photon-nonreceived response; and
interpreting the second photonic response as the first binary numeric value if the second photonic response comprises the photon-received response and as the second binary numeric value if the second photonic response comprises the photon-nonreceived response.

10. A system comprising:
a first electron source configured to emit a first electron having a first predetermined energy at a first nanoparticle of a photon emission material comprising a first layer of a plurality of nanoparticles;
a first sensor configured to determine a first photonic response of the receipt of the first electron by the first nanoparticle that comprises one of a photon-received response and a photon-nonreceived response; and
a controller configured to interpret the first photonic response as a first numeric value if the first photonic response comprises the photon-received response and as a second numeric value that differs from the first numeric value if the first photonic response comprises the photon-nonreceived response.

11. The system of claim 10, wherein the photon-received response comprises a receipt, by the first sensor, of a photon in a predetermined wavelength band within a predetermined period of time.

12. The system of claim 10, wherein the photon-nonreceived response comprises a lack of a receipt, by the first sensor, of a photon in a predetermined wavelength band within a predetermined period of time.

13. The system of claim 10, wherein the first sensor comprises a 32×32 detector element image sensor.

14. The system of claim 10, further comprising the photon emission material, and wherein the nanoparticles comprise one of a phosphor, a fluorophore, a nano-crystal, a nanotube, and a micro-nano crystal phosphor complex.

15. The system of claim 10, wherein:
the first electron source is further configured to emit a second electron having a second predetermined energy at a second nanoparticle of a plurality of nanoparticles in a second layer that is behind the first layer;
the first sensor is further configured to determine a second photonic response of the receipt of the second electron by the second nanoparticle that comprises one of the photon-received response and the photon-nonreceived response; and
the controller is further configured to interpret the second photonic response as the first numeric value if the second photonic response comprises the photon-received response and as the second numeric value if the second photonic response comprises the photon-nonreceived response.

16. The system of claim 15, wherein the plurality of nanoparticles in the first layer comprises a different composition from the plurality of nanoparticles in the second layer.

17. The system of claim 10, further comprising:
a plurality of electron sources, including the first electron source, the plurality of electron sources configured to concurrently emit a plurality of electrons, including the first electron, having the first predetermined energy at a group of nanoparticles in the first layer;
wherein the first sensor is further configured to determine photonic responses of the receipt of the plurality of electrons by the group of nanoparticles that comprise one of the photon-received response and the photon-nonreceived response; and
wherein the controller is further configured to interpret the photonic responses as numeric values.

18. The system of claim 10, further comprising:
a second electron source configured to emit, substantially concurrently with the emission of the first electron by the first electron source, a second electron having the first predetermined energy at a second nanoparticle of the plurality of nanoparticles in the first layer;
a second sensor configured to determine a second photonic response of the receipt of the second electron by the second nanoparticle that comprises one of the photon-received response and the photon-nonreceived response; and
wherein the controller is further configured to interpret the second photonic response as the first numeric value if the second photonic response comprises the photon-received response and as the second numeric value if the second photonic response comprises the photon-nonreceived response.

19. The system of claim 10, wherein the first electron source is further configured to emit a plurality of electrons, including the first electron, having the first predetermined energy at the first nanoparticle.

20. A method for obtaining data, comprising:
emitting, by a first electron source, a first electron having a first predetermined energy at a first nanoparticle of a photon emission material comprising a first layer of a plurality of nanoparticles;
determining a first photonic response of the receipt of the first electron by the first nanoparticle, the first photonic response comprising an emission of a photon by the first nanoparticle;

interpreting the first photonic response as a first numeric value;
emitting, by the first electron source, a second electron having the first predetermined energy at a second nanoparticle of the photon emission material;
determining a second photonic response of the receipt of the second electron by the second nanoparticle, the second photonic response comprising a lack of an emission of a photon by the second nanoparticle within a predetermined timeframe; and
interpreting the second photonic response as a second numeric value that differs from the first numeric value.

21. The system of claim 10, wherein the first numeric value comprises a 1 and the second numeric value comprises a 0.

22. The system of claim 10, wherein the first numeric value comprises a 0 and the second numeric value comprises a 1.

* * * * *